June 19, 1934.     H. R. MARK     1,963,629
METHOD OF FABRICATING WELL SCREENS
Filed April 19, 1932     2 Sheets-Sheet 1
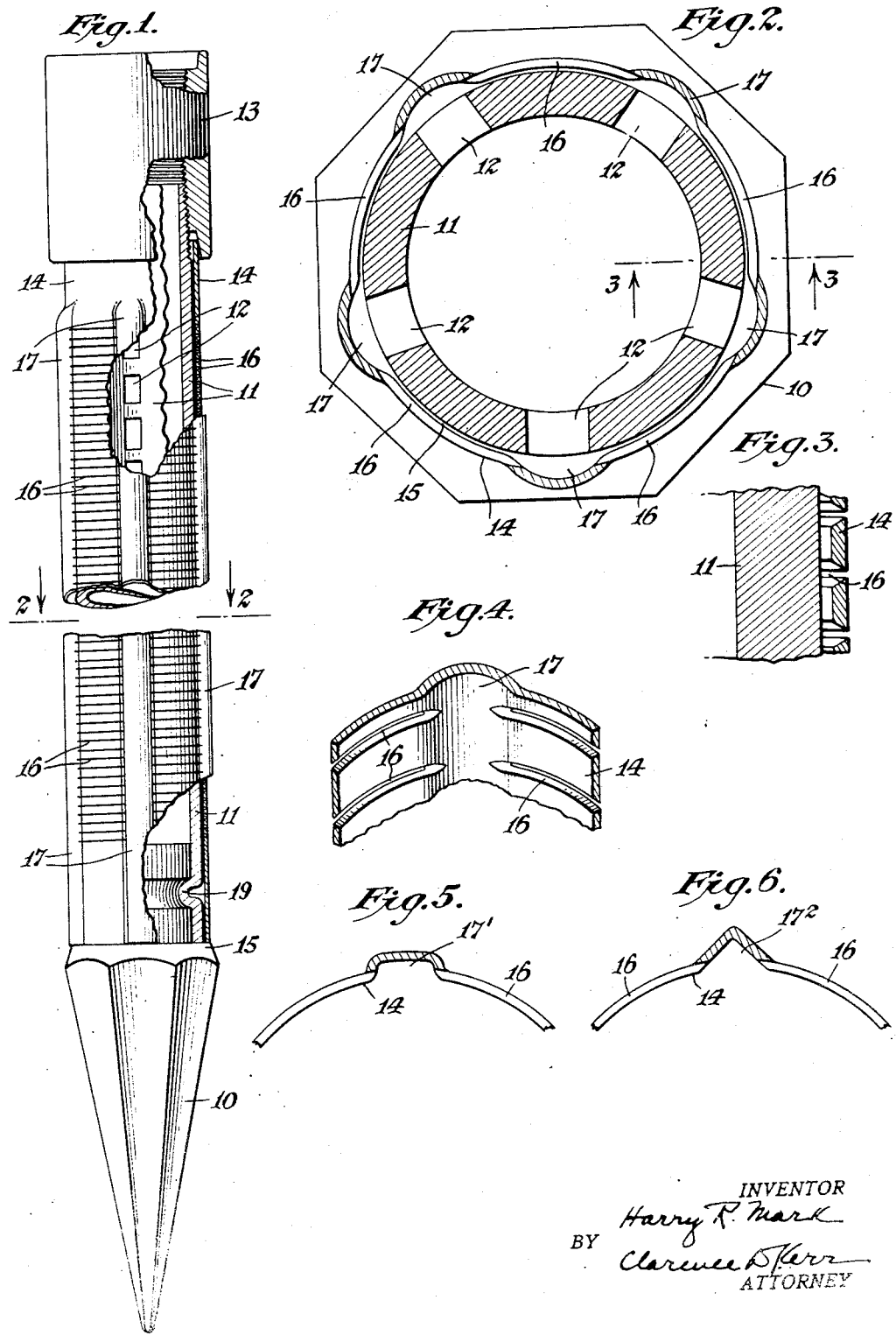
INVENTOR
Harry R. Mark
BY Clarence D. Kerr
ATTORNEY June 19, 1934.  H. R. MARK  1,963,629
METHOD OF FABRICATING WELL SCREENS
Filed April 19, 1932  2 Sheets-Sheet 2

INVENTOR
Harry R. Mark
BY Clarence D. Kerr
ATTORNEY

Patented June 19, 1934

1,963,629

UNITED STATES PATENT OFFICE 1,963,629

METHOD OF FABRICATING WELL SCREENS

Harry Richard Mark, Evanston, Ill., assignor to Clayton Mark & Company, Chicago, Ill., a corporation of Delaware Application April 19, 1932, Serial No. 606,106

2 Claims. (Cl. 29—163.5)

This invention relates to well screens and more particularly to those used in conjunction with drive well points, although other uses for the present invention will be apparent, for instance, in drilled wells, where well screens are used, although no well point is present.

In constructing wells of the driven type, it is the practice to employ a well point, which comprises a section of pipe forming the screen support, on the lower end of which pipe section is secured a pointed projection which is useful in facilitating the driving of the well point into the ground. A well screen, which surrounds and encloses the perforated screen support, is a usual member of such well points. At the upper end of the pipe section constituting the screen support may be a coupling member adapted to permit the coupling of additional sections of pipe to the well point as the latter is driven more and more deeply into the earth.

One object of the present invention is the provision of an improved well screen consisting of a metal tube pierced by a plurality of slots to permit the entrance of water, each of said slots communicating at each end with a channel through which the water is conducted to openings in the screen support and thence into the interior of the pipe. A further object is the provision of a method of fabricating such improved well screens, whereby the same may be constructed quickly and with a minimum of expense. Other and further objects will appear from the following specification.

Figure 7:
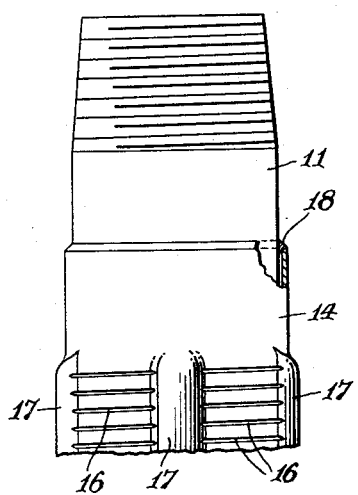
Figure 8:
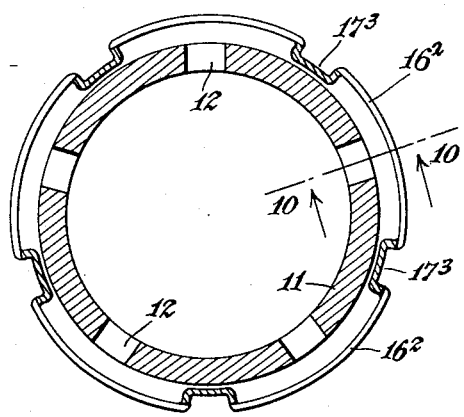
Figure 10:
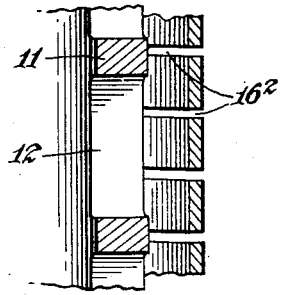
Figure 9:
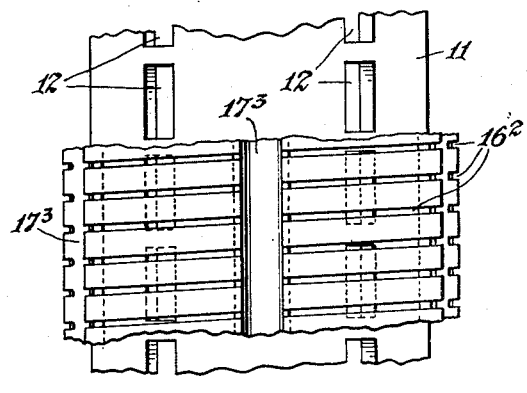
Figure 11:
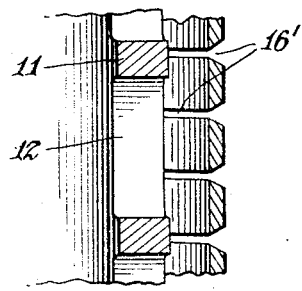

Referring to the accompanying drawings, Fig. 1 is a fragmentary elevational view, partly in section, of a drive well point assembly embodying the present invention; Fig. 2 is a horizontal section on line 2—2 of Fig. 1; Fig. 3 is a fragmentary vertical section on line 3—3 of Fig. 2; Fig. 4 is a fragmentary perspective of the improved well screen of the present invention; Figs. 5 and 6 are fragmentary sectional views illustrating two alternative forms of the well screen channels; Fig. 7 is a fragmentary elevational view of the upper end of a drive well point assembly, showing an alternative construction; Fig. 8 is a horizontal section through the screen support and well screen members, illustrating an alternative form of screen; Fig. 9 is fragmentary elevational view of the form of device shown in Fig. 8; Fig. 10 is a fragmentary vertical section on line 10—10 of Fig. 8; Fig. 11 is a view similar to Fig. 10, but showing an alternative type of construction.

In Fig. 1 of the accompanying drawings, the numeral 10 designates a driving point secured to the lower end of the tubular screen support 11 by any suitable means, as at 19. The screen support 11 consists of a section of pipe perforated by small openings 12 to permit the ingress of water which penetrates the well screen 14, and serves the additional purpose of transmitting the driving force to the driving point 10. The coupling member 13, at the upper end of screen support 11 has the double purpose of providing means for joining additional sections of pipe to the well point, and of serving to retain the well screen 14 in place by pressing it firmly down against the shoulder 15 at the upper end of the driving point 10.

The well screen 14 is provided with a plurality of transverse slots 16, preferably formed in a manner hereinafter described, and with the channels 17, one of which intervenes between each row of slots 16. Referring to Figs. 3, 4, it will be seen that the slots 16 are progressively wider from the exterior to the interior of the well screen. This feature serves the purpose of preventing clogging of the well screen by minute particles of earth or other matter, since any particle sufficiently small to enter the narrow outer extremity of the slot 16 will readily pass the remaining distance through the slot.

The channels 17 are rolled or otherwise formed in the well screen 14, and are of a depth approximating the thickness of the material of which the well screen is formed. Preferably the channels 17 are equal in number to the rows of perforations 12 in the screen support 11, so that each channel may be placed opposite a row of perforations 12 to facilitate the flow of water.

In forming the slots 16, each end of each slot is continued through the walls of the adjacent channel 17, (Fig. 4) thus providing communication between each slot and its adjacent channels, and providing, for the water flowing in through the several slots, a free path to the perforations 12 and thence to the interior of the screen support or pipe 11.

The improved well screen of the present invention may be quickly and inexpensively constructed from a section of the plain cylindrical metal tubing of commerce. For this purpose brass tubing is preferable, since it is comparatively soft and well adapted to the process involved, and at the same time resists corrosion, to which it is subjected while in use in a well. However, other materials may be used.

In fabricating the well screen, the first operation consists in forming the channels 17, which may be done by a rolling process or by other suitable means, such as by drawing the tube over an inside mandrel.

In performing this step of the process, of course, a portion of the tube at one end thereof may be retained in its cylindrical form, in order that a tight joint may be effected between such portion of the well screen and the coupling member 13. A short section at the other end of the tube may also be left in cylindrical form if desired, or if necessary to make a tight joint with the particular driving point used.

After the channels 17 have been formed in the tube, a rotary cutting tool, such as the well known tap or thread cutting device, is inserted in the tube and is rotated and, at the same time, is moved longitudinally through the tube, exactly as in cutting internal helical screw threads. However, in the present case the tap is adjusted to a cutting radius which will result in cuttting entirely through those portions of the tube which have not been displaced to form the channels 17. This operation results in the formation of the slots 16.

This operation may be commenced and stopped at any desired distance from the respective ends of the tube, but cannot, of course, be carried beyond the extremities of channel 17 without destroying the tube. The result of the sequence of operations described is to produce a tube provided with channels 17 and slots 16, the width of the latter progressively diminishing toward the exterior of the tube, and each slot communicating at each end with an adjacent channel.

Due to the shape of the channels 17 the movement of the cutting tool may be continuous relative to the tube as it is not necessary to retract the cutting blades to leave uncut portions of the tube, in order to avoid complete severance of the tube. Hence my improved method may accordingly be carried out at a very rapid rate with a simple cutting machine and at a comparatively low cost. It has been found that my improved well screen, with its longitudinal channels and transverse slots communicating therewith has a greater capacity than those of a similar fineness heretofore known.

Another advantage resides in the stiffening effect of the longitudinal channels 17, which, due to their concave form, greatly increase the strength of the well screen as compared with a similar screen without channels. In addition, the projecting outer walls of the channels serve to protect the well screen from injury while being driven.

If desired, the process can be varied to produce the well screen of Figs. 8, 9, 10 and 11, which, though not as desirable, in certain respects, as the preferred form heretofore described, is nevertheless an acceptable well screen, and may be very economically produced. In this embodiment the channels $17^3$ are formed inwardly of the plane of the exterior surface of the tube, and the cutting of the slots 16' and $16^2$ is performed from the outside of the tube. If a thread-cutting device is used, the slots 16' (Fig. 11) will be the reverse of the slots 16 of Fig. 3, that is, the width of the slots 16' will increase toward the exterior of the well screen. If it is desired to avoid this result, a saw or milling cutter may be employed to cut the slots $16^2$ of uniform width, as in Fig. 10. In either case, this operation may be performed with a continuous rotation of the work, and without withdrawing the tool therefrom.

As illustrated in Fig. 8, in making use of this alternative embodiment of my invention the well screen is positioned so that the slotted portions thereof are opposite the rows of perforations 12, providing free access for water flowing from the slots $16^2$ to the perforations 12.

The channels 17 need not be of the arcuate cross-section shown in Figs. 1, 2, 4 and 7, but may be of any suitable cross-section, such as the channel shape 17' and $17^3$ of Figs. 5 and 8 or the V-shape $17^2$ of Fig. 6.

If desired, the coupling member 13 may be omitted, as in Fig. 7. In this case the upper end of the well screen is soldered to the screen support as at 18, forming a water-tight joint therebetween.

When used in a drilled well, in which case the well point, which ordinarily forms the well screen support, is not used, it may be desirable to form the well screen of heavier material than in the ordinary case. When used in this manner, the lower end of the well screen must, of course, be closed, which may be done in any suitable manner.

The terms employed in the foregoing specification are terms of description and not of limitation, and I do not wish to be limited to the particular constructions disclosed, since various modifications of the same may be made within the scope of the present invention.

What I claim is:

1. The method of fabricating a well screen, consisting in displacing portions of a tube radially to form a plurality of longitudinally extending channels therein, and effecting relative rotary and longitudinal movements between said tube and a cutting tool whereby said tube is provided with a plurality of rows of helical slots extending between adjacent channels.

2. The method of fabricating a well screen, consisting in forming channels in the inner surface of a substantially cylindrical tube, said channels being at least of a depth approximating the thickness of the material of said tube, and effecting relative rotary and longitudinal movements between said tube and a cutting tool positioned within said tube, whereby helical slots are formed in said tube between said channels.

HARRY RICHARD MARK.